Feb. 16, 1965  J. M. GRUBER  3,169,504
CATHODIC SYSTEM

Filed Dec. 16, 1963  2 Sheets-Sheet 1

INVENTOR.
Jerome M. Gruber
BY Warren H. F. Schmieding
ATTORNEY

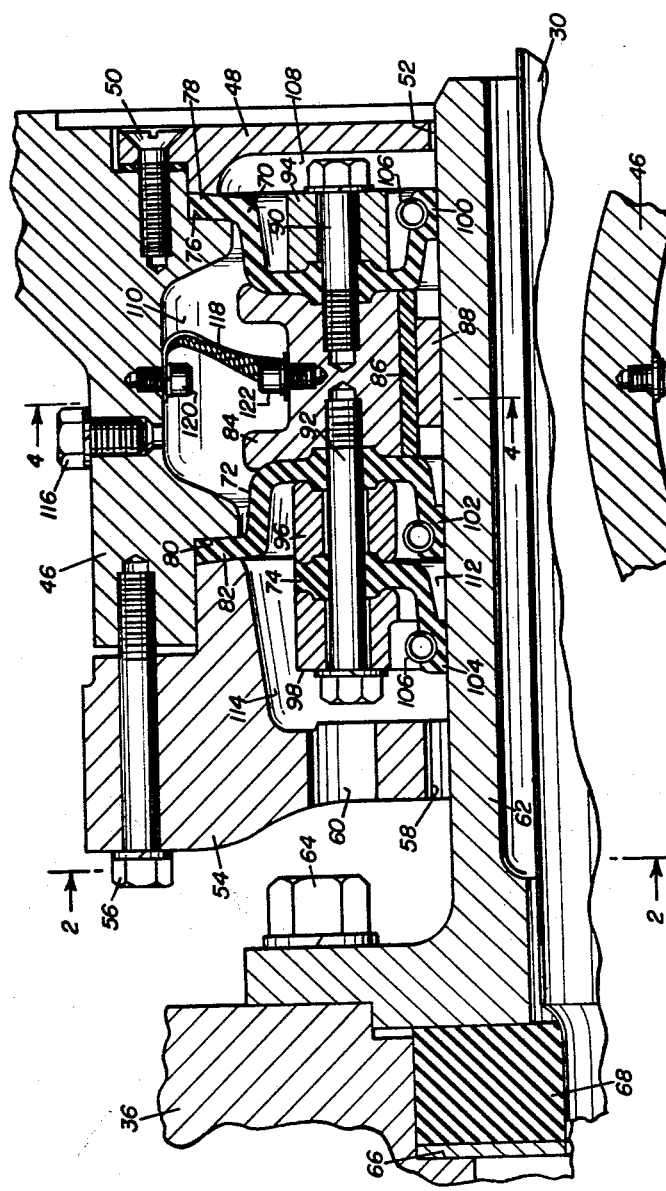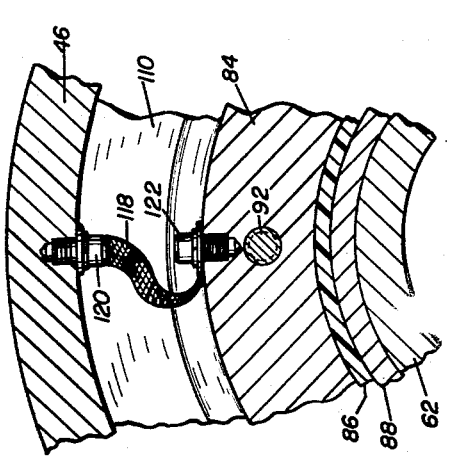

United States Patent Office 3,169,504
Patented Feb. 16, 1965

3,169,504
CATHODIC SYSTEM
Jerome M. Gruber, Waukesha, Wis., assignor to Waukesha Bearings Corporation, Waukesha, Wis., a corporation of Wisconsin
Filed Dec. 16, 1963, Ser. No. 330,723
10 Claims. (Cl. 115—.5)

The present invention relates to a cathodic system for preventing corrosion, and more particularly to a system for preventing corrosion of metallic parts of the seal for a propeller shaft of ships having steel hulls.

As is well known, the propeller shaft and bearings therefor must be lubricated, as for example, by oil. When oil is used as the lubricant for the shaft and bearings therefor, seals must be provided for preventing ingress of water to the bearings and for preventing the escape of oil through the bearings. Inasmuch as radial movement of the shaft is apt to develop, the seal to be effective, must follow the radial movement of the shaft. Therefore, a floating seal is desirable. However, this seal must be supported by a guide means which follows the radial movement of the shaft. Such guide means is formed preferably of metal. The movement of the guide means is limited substantially to radial movement accommodating the radial movement of the shaft.

Usually the propeller and the guide means are formed of bronze. In view of the fact that the propeller is rotating in an electrolyte, for example sea water, electron emission from the propeller takes place at a rapid rate, thus the propeller forms a sink for electrons, and since this bronze guide means is connected with the propeller through the propeller shaft, the guide means functions as an anode and the propeller as a cathode. This results in dissolution of the bronze guide means which in turn results in failure of the seal. Consequently the oil escapes through the bearings and water enters the bearings, causing disintegration of the bearings.

The repair costs are high, since the ship must be in dry dock, the labor extended over days, and the revenue for the use of the ship during this period is lost.

In practicing the present invention, that part of the guide means which rides on the shaft is electrically insulated from the bronze part which carries the sealing ring or rings. Also, all bronze parts of the sealing assembly are electrically connected with the hull of the ship. The hull being formed of steel is less noble than the bronze, i.e., it is higher in the electrochemical series than the bronze. Consequently, the entire hull of the ship functions as an anode and the bronze functions as a cathode, whereby the electrons emanating from the bronze in the sea water are replaced by the electrons flowing from the hull.

Other features and the advantages of the present invention will be apparent from the following description, reference being had to the accompanying drawings wherein a preferred embodiment of the invention is illustrated.

In the drawings:

FIG. 3 is a fragmentary sectional view looking in the direction of arrows 3—3 of FIG. 1, but on a larger scale; and FIG. 4 is a fragmentary sectional view looking in the direction of arrows 4—4 of FIG. 3.

Figure 2:
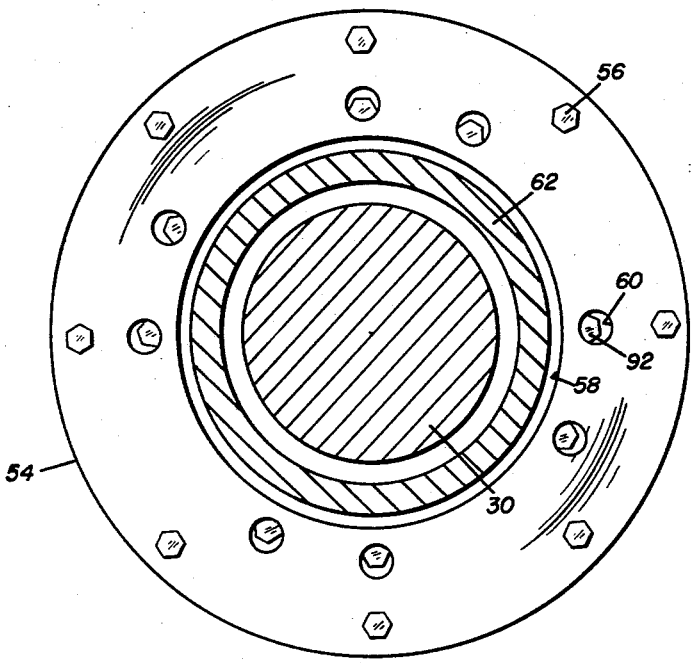
FIG. 2 is a view looking in the direction of lines 2—2 of FIG. 3, showing the after cover for the seal assembly.
Figure 1:
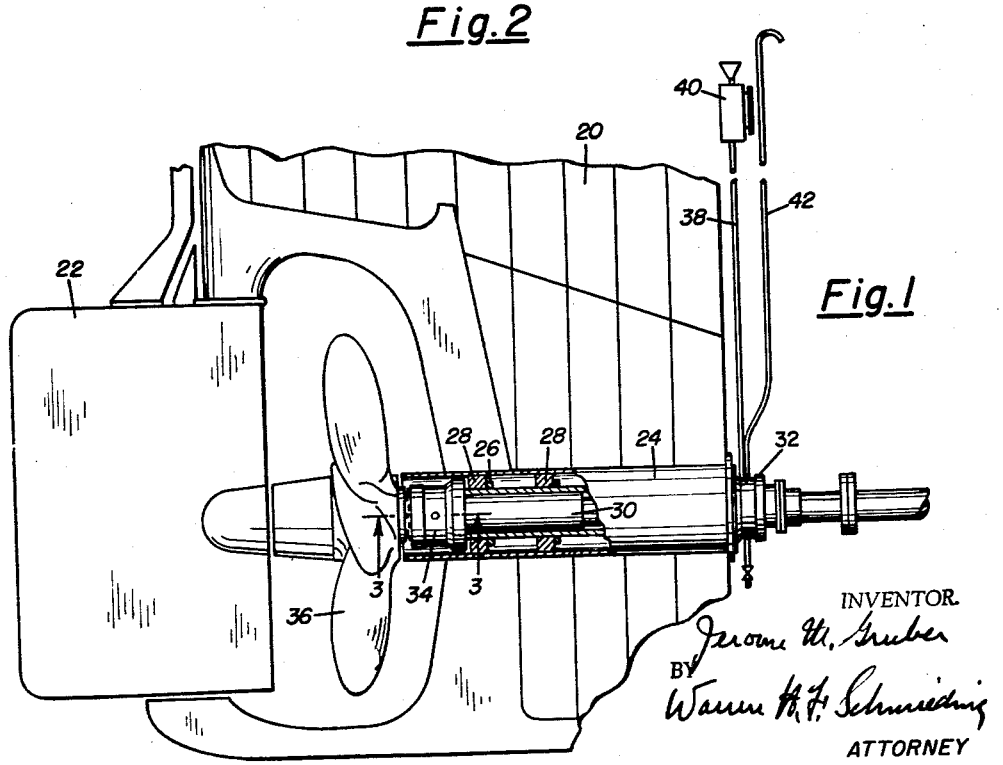
FIG. 1 is a fragmentary view, partly in section, of the stem of a steel hull of a ship, the section showing the tube for supporting the aft bearings for the propeller shaft, and showing the aft bearings, the shaft seals being shown in elevation.

Referring more in detail to the drawings, the aft of the steel hull of the ship is shown at 20, and the rudder at 22. A tube 24 is suitably secured to the hull and it carries rings 26 which support shaft bearings 28. The propeller shaft 30 extends through the tube 24 and is journalled in the bearings. The tube is sealed by a front seal 32 and a rear seal 34. The propeller 36 is suitably attached to the shaft 30. Oil, for lubricating the bearing or bearings 28, is delivered to the interior of the tube 24 by a pipe 38 which receives oil from a reservoir 40. Air from the tube can escape through a pipe 42. This reservoir is placed between ten and thirteen feet above the water line. The tube 24 is maintained flooded with oil for lubricating the shaft and bearings.

The rear end of the tube 24 carries the seal assembly 44. This assembly includes a metal ring 46 which is bolted to the rear side of the rearmost ring 26 and surrounds the shaft 30. The front of ring 46 is provided with a cover 48 which is held in place by screws 50, and is provided with a shaft opening 52. The rear of ring 46 is provided with a rear cover 54 which is held in place by bolts 56, and is provided with a shaft opening 58. The rear cover 54 is provided with a plurality of holes 60.

A sleeve 62 is secured to the front side of the propeller 36 by bolts 64. This sleeve extends forwardly to in front of the front cover 48. This sleeve and the shaft 30 are at times referred to in the claims as a "rotating element." The propeller 36 is provided with a forwardly facing annular shoulder 66. A sealing ring 68 is interposed between the rear side of the sleeve 62 and the shoulder 66. This sealing ring 68 may be formed of compressible synthetic rubber or other suitable material, and when compressed, by tightening bolts 64, it closely embraces the rear end of the shaft 30 to form a seal with the shaft.

The seal assembly also includes three circular and flexible seals 70, 72 and 74 formed of synthetic rubber or other suitable material. The rim of seal 70 is pressed into sealing relationship with a forwardly facing, annular shoulder 76 on ring 46 by the annular rearwardly extending annular flange 78 on front cover 48. The rim of seal 72 is pressed into sealing relationship with a rearwardly facing, annular shoulder 80 on ring 46 by a forwardly extending annular flange 82 on rear cover 54.

A metal ring 84 surrounds the rotating element (the sleeve 62 and shaft 30) and is interposed between the circular seals 70 and 72. A ring 86 of dielectric material is suitably secured in the hollow of the ring 84. Ring 88 formed of suitable bearing material, such as a babbitt, is suitably secured in the interior wall of the dielectric ring 86. The seals 70 and 72 are pressed into sealing relationship with the ring 84 by series of bolts 90 and 92, respectively. Bolts 90 extend through a ring 94 and when tightened, circular seal 70 is compressed between rings 94 and 46. Bolts 92 extend through a ring 96, the seal 74, and a ring 98. When the bolts 90 and 92 are tightened, circular seal 74 is compressed between rings 96 and 98. Seal 70 is provided with a forwardly extending annular portion 100; seals 72 and 74 are provided, respectively, with rearwardly extending annular portions 102 and 104. Three annular portions are pressed into sealing relationship with the periphery of the sleeve 62 by annular coil springs 106.

The assembly comprises four compartments 108, 110, 112 and 114. Compartment 108 is formed by front cover 48, the sleeve 62 and the seal 70; compartment 110 is formed by the ring 46, babbitt ring 88, sleeve 62 and seal 72; compartment 112 is formed by seal 72, sleeve 62 and seal 74; and compartment 114 is formed by seal 72, sleeve 62 and rear cover 54. Oil from the tube 24 passes through the opening 52 into the compartment 108. The annular extending portion 100 of seal 72, bearing against the sleeve 62, prevents the passage of oil into compartment 110. Oil is supplied to the compartment 110 through a removable plug 116. Oil is prevented from escaping from compartment 110 to compartment 108 by the outlet extension 100 of seal 70, and oil is prevented from escaping into compartment 112 by the outlet extension 102 of seal 72. The compartment 114 is open to sea water through the opening 58 and the series of holes 60 in the cover 54. Water within the compartment 114 is prevented from seeping into compartment 112 by the annular extension 104 of seal 74. Should any water seep through the extension 104, it is prevented from entering the oil chamber 110 by the extension 102 of sleeve 72.

The series of holes 60 in the rear cover 54 provides for lightening the weight of the cover; also the holes provide for viewing the interior of the sealed assembly, and provide for the circulation of water through the chamber 114. The rotation of the sleeve 62 causes the water to be moved centrifugally, whereby should any dirt enter the opening 58, it will be flung outwardly and through the holes 60.

The propeller 36 and the rings 94, 84, 96 and 98, the bolts 90 and 92, are formed of non-corrosive metal, such as bronze or Monel bronze. Sleeve 62 is formed of stainless steel. Heretofore, a ring, similar to 84, was contacted by the sleeve 62, with the result that said ring and rings 94, 96 and 98, and bolts 90 and 92 function as an anode for supplying electrons to the sleeve 62 and the propeller 36. The reason for this was that due to the rotation of the sleeve 62 and the propeller 36, electrons were emitted, whereby the sleeve and the propeller function as a sink for electrons and were supplied with electrons by the rings 94, 84, 96, 98 and the bolts 90 and 92. This caused dissolution of these rings and bolts, resulting in the destruction of the seal, whereby water could leak into the bearings and oil leak out of the tube and about the bearing, causing destruction of the shaft and the bearing.

By electrically insulating the ring 84 from the sleeve 62, as by the insulating ring 86, the propeller no longer functions as a cathode, in that the ring 84 could no longer function as an anode. Nevertheless, all of the seals can follow any radial movement of the rotating element (shaft 30 and sleeve 62) by reason of the inclusion of the guiding babbitt ring 88. The seals, being guided by the babbitt ring 88, follow all wobbling of the rotating element. The babbitt ring 88 is not subjected to electrolysis, in view of the fact that it is immersed in oil. It will be observed that the floating seal assembly is electrically connected by a series of straps, one of which is shown at 118, to the hull of the ship by being bolted to the ring 46 by bolts 120. The strap is bolted to the ring 84 by bolts 122. Due to the fact that the steel hull of the ship is higher in the electrochemical series, than the bronze or Monel bronze of the rings 94, 84, 96 and 98, and bolts 90 and 92, it functions as an anode for supplying electrons to said rings and bolts, i.e. such rings and bolts function as a cathode whereby erosion cannot take place. Due to the relative size of the hull with respect to the cathode, the electron discharge from the hull is at a minimum, and can be said to have no effect in enhancing corrosion of the hull.

While the form of embodiment herein shown and described, constitutes preferred form, it is to be understood that other forms may be adopted falling within the scope of the claims that follow.

I claim:
1. A combination including:
   (A) A ship having:
      (1) a metallic hull;
      (2) a propeller;
      (3) a rotating element including a shaft carried by the hull for rotating the propeller;
      (4) a seal for preventing ingress of water to the hull along the rotating element, and for preventing the egress of oil from the hull along the rotating element, said seal including:
         (a) a sealing ring surrounding and contacting the rotating element;
         (b) metallic means supporting the sealing ring, said metallic means being lower in the electrochemical series than the hull;
      (5) and means for electrically connecting the metallic means with the hull, whereby the hull functions as an anode and the metallic means as a cathode.

2. A combination as defined in claim 1, characterized in that the metallic means is in the form of a ring surrounding the rotating element.

3. A combination as defined in claim 1, characterized in that the seal (A)(4) of claim 1 includes:
   (c) a metallic guide riding on the rotating element, said guide carrying the metallic supporting means;
   (d) and means for insulating the metallic guide from said metallic supporting means.

4. A combination as defined in claim 3, characterized in that the metallic guide is in the form of a ring surrounding the rotating element.

5. A combination as defined in claim 3, characterized in that the means (d) of claim 3 is in the form of a ring surrounding the rotating element.

6. A combinatoin as defined in claim 3, characterized in that the means (d) of claim 3 is in the form of a ring, and the metallic guide is in the form of a ring surrounding the said means (d).

7. A combination as defined in claim 1, characterized in that the seal (A)(4) of claim 1 includes:
   (c) a second sealing ring surrounding and contacting the rotating element, and that the metallic means (b) of claim 1 is in the form of a ring interposed between the sealing rings;
and further characterized to include:
   (d) a metallic guide ring riding on the rotating element;
   (e) and an insulating ring surrounding the metallic guide and supporting the metallic ring.

8. A combination including:
   (A) A ship having:
      (1) a metallic hull;
      (2) a propeller;
      (3) a rotating element including a shaft carried by the hull for rotating the propeller;
      (4) a seal for preventing ingress of water to the hull along the rotating element, and for preventing the egress of oil from the hull along the rotating element, said seal including:
         (a) a sealing ring surrounding and contacting the rotating element;
         (b) metallic means supporting the sealing ring;
      (5) metallic guiding means riding on the rotating element and carrying the first mentioned metallic means;
      (6) and means interposed between the first mentioned metallic means and the metallic guiding means for electrically insulating the first mentioned means from the metallic guiding means.

9. A combination as defined in claim 8, characterized in that the metal sealing ring supporting means is in the form of a ring surrounding the rotating element.

10. A combination as defined in claim 8, characterized in that the means for electrically insulating the metal sealing ring supporting means from the metallic guiding means is in the form of a ring surrounding the rotating element.

References Cited by the Examiner

UNITED STATES PATENTS

| | | | |
|---|---|---|---|
| 727,381 | 5/03 | Knudson | 204—197 X |
| 3,108,055 | 10/63 | Grant | 204—197 X |

FOREIGN PATENTS 854,909  11/60  Great Britain.

MILTON BUCHLER, *Primary Examiner.*
ANDREW H. FARRELL, *Examiner.*